US012794700B2

(12) United States Patent
Gondža

(10) Patent No.: US 12,794,700 B2
(45) Date of Patent: Nov. 10, 2026

(54) MANAGING PASSWORDS FOR NETWORK-ACCESSIBLE SERVICE ACCOUNTS

(71) Applicant: RED HAT, INC., Raleigh, NC (US)

(72) Inventor: Oliver Gondža, Brno (CZ)

(73) Assignee: Red Hat, LLC, Raleigh, NC (US)

( * ) Notice: Subject to any disclaimer, the term of this patent is extended or adjusted under 35 U.S.C. 154(b) by 250 days.

(21) Appl. No.: 17/006,140

(22) Filed: Aug. 28, 2020

(65) Prior Publication Data

US 2022/0070000 A1 Mar. 3, 2022

(51) Int. Cl.

*H04L 9/32* (2006.01)
*H04L 9/08* (2006.01)

(52) U.S. Cl.

CPC ............ *H04L 9/3226* (2013.01); *H04L 9/085* (2013.01); *H04L 9/3236* (2013.01); *H04L 9/3247* (2013.01)

(58) Field of Classification Search

CPC ..... H04L 9/3226; H04L 9/085; H04L 9/3236; H04L 9/3247

See application file for complete search history.

(56) References Cited

U.S. PATENT DOCUMENTS

| | | | | |
|---|---|---|---|---|
| 6,178,508 | B1 * | 1/2001 | Kaufman | G06F 21/40 726/19 |
| 6,804,777 | B2 * | 10/2004 | Hollis | H04L 63/0442 713/153 |
| 8,234,302 | B1 * | 7/2012 | Goodwin | H04L 63/107 726/28 |
| 8,375,425 | B2 * | 2/2013 | Keohane | G06F 21/46 713/181 |
| 8,769,637 | B2 * | 7/2014 | Janzen | G06F 21/31 713/168 |
| 8,930,704 | B2 * | 1/2015 | Chen | G06F 21/6254 713/176 |
| 8,959,618 | B2 | 2/2015 | Schneider | |
| 9,246,686 | B1 * | 1/2016 | Holland | H04L 63/12 |
| 9,379,896 | B1 | 6/2016 | Altman | |
| 9,652,606 | B2 | 5/2017 | Cavanagh | |
| 9,660,972 | B1 * | 5/2017 | Roth | H04L 9/3228 |
| 9,727,310 | B2 * | 8/2017 | Margetts | G06F 7/588 |

(Continued)

FOREIGN PATENT DOCUMENTS

WO WO-2017039156 A1 * 3/2017 ............. G06F 21/31

OTHER PUBLICATIONS

Sabeldfel et al., "A Model for Delimited Information Release", Springer-Verlag, LNCS 3233, pp. 174-191 (Year: 2004).*

(Continued)

*Primary Examiner* — John B King
*Assistant Examiner* — Alex D Carrasquillo
(74) *Attorney, Agent, or Firm* — Dority & Manning, P.A.

(57) ABSTRACT

A method includes generating, by a password manager, an updated password for an account registered with a network accessible server. The method further includes generating, by the password manager, a cryptographic salt value. The method further includes computing, by the password manager and using the cryptographic salt value, a hash value of the updated password. The method further includes transmitting, by the password manager, the hash value of the updated password and the cryptographic salt value to the network-accessible service.

11 Claims, 7 Drawing Sheets

(56) References Cited

U.S. PATENT DOCUMENTS

| | | | | |
|---|---|---|---|---|
| 9,882,717 | B2 * | 1/2018 | Camenisch | H04L 9/0863 |
| 9,961,053 | B2 * | 5/2018 | Yedidi | H04L 63/06 |
| 10,079,855 | B2 | 9/2018 | Versteeg et al. | |
| 10,776,480 | B2 * | 9/2020 | Humble | H04L 63/083 |
| 10,848,304 | B2 * | 11/2020 | Chumbley | H04L 9/0894 |
| 11,062,018 | B2 * | 7/2021 | Dymond | H04L 9/0643 |
| 2007/0074038 | A1 * | 3/2007 | Arenburg | H04L 9/3226 713/181 |
| 2007/0124807 | A1 * | 5/2007 | Jau | H04L 9/3226 726/6 |
| 2007/0192601 | A1 * | 8/2007 | Spain | G06F 21/42 713/168 |
| 2008/0092216 | A1 * | 4/2008 | Kawano | G06F 21/46 726/5 |
| 2009/0006852 | A1 * | 1/2009 | Qiu | H04L 9/3226 713/176 |
| 2011/0202982 | A1 * | 8/2011 | Alexander | G06F 21/36 726/6 |
| 2012/0159612 | A1 * | 6/2012 | Reisgies | G06F 21/41 726/18 |
| 2013/0212385 | A1 * | 8/2013 | Schechter | G06F 21/31 713/168 |
| 2015/0026784 | A1 * | 1/2015 | Kurkure | H04L 63/083 726/7 |
| 2015/0254452 | A1 * | 9/2015 | Kohlenberg | G06F 21/45 726/6 |
| 2015/0278509 | A1 * | 10/2015 | Arning | G06F 21/46 726/6 |
| 2017/0011214 | A1 * | 1/2017 | Cavanagh | H04L 63/0846 |
| 2017/0054704 | A1 * | 2/2017 | Barkie | H04L 63/067 |
| 2017/0187697 | A1 * | 6/2017 | Li | H04L 63/06 |
| 2018/0173891 | A1 * | 6/2018 | Wang | G06F 21/6245 |
| 2019/0050557 | A1 * | 2/2019 | Martin | H04L 63/08 |
| 2019/0108363 | A1 * | 4/2019 | Caldwell | G06F 21/554 |
| 2019/0220590 | A1 * | 7/2019 | De Jonge | H04L 9/0643 |
| 2019/0280863 | A1 * | 9/2019 | Meyer | H04L 9/50 |
| 2020/0028679 | A1 * | 1/2020 | Chumbley | H04L 9/0894 |
| 2020/0082124 | A1 * | 3/2020 | Pedersen | H04L 9/3226 |
| 2022/0045848 | A1 * | 2/2022 | Hulshof | H04L 9/085 |
| 2024/0089249 | A1 * | 3/2024 | Richardson | H04L 9/3226 |

OTHER PUBLICATIONS

Sabeldfel et al., A Model for Delimited Information Release; Springer; Software Security—Theories and Systems; 2003; pp. 174-191 (Year: 2003).*

Boonkrong et al., “Dynamic Salt Generation and Placement for Secure Password Storing”, 2016, IAENG International Journal of Computer Science (Year: 2016).*

Kurt Thomas et al., “Protecting Accounts from Credential Stuffing with Password Breach Alerting”, Google, https://www.usenix.org/system/files/sec19-thomas.pdf, Aug. 14-16, 2019, pp. 1555-1571.

Michael Farcasin et al., “Fluid Passwords-Mitigating the Effects of Password Leaks at the User Level”, Oklahoma State University Stillwater, https://arxiv.org/pdf/1708.09333.pdf, Oklahoma, Aug. 30, 2017, 11 pages.

* cited by examiner

410

| SERVICE IDENTIFIER 412 | ACCOUNT IDENTIFIER 414 | CLIENT DEVICE IDENTIFIER 416 | CURRENT PASSWORD 418 | CURRENT SALT VALUE 420 | PRIOR PASSWORD 422 | PRIOR SALT VALUE 424 |
|---|---|---|---|---|---|---|
| SERVICE A | ACCOUNT A | DEVICE A | 9d32f5t624 | 0123 | jg02hr9bk3 | 692538 |
| • • • | | | | | | |
| SERVICE A | ACCOUNT N | DEVICE N | Djf29nkfoe | 92052 | of0jJH9nr02i | 024 |

FIG. 4A

450

| ACCOUNT IDENTIFIER 452 | CURRENT HASH VALUE 454 | CURRENT SALT VALUE 456 | PRIOR HASH VALUE 458 | PRIOR SALT VALUE 460 |
|---|---|---|---|---|
| ACCOUNT A | DFCD394 | 0123 | H924NNO | 692538 |
| • • • | | | | |
| ACCOUNT N | JDO40WJ3 | 92052 | AJF03J95 | 024 |

FIG. 4B

MANAGING PASSWORDS FOR NETWORK-ACCESSIBLE SERVICE ACCOUNTS

TECHNICAL FIELD

Embodiments of the present disclosure relate to computing systems, and more specifically, relate to managing passwords for user accounts registered with network-accessible services.

BACKGROUND

A client device can register an account with a network-accessible service. The network-accessible service can protect data associated with the registered account through a unique password that is known only by the client device and is verifiable by the network-accessible service.

BRIEF DESCRIPTION OF THE DRAWINGS

The disclosure is illustrated by way of example, and not by way of limitation, and can be more fully understood with references to the following detailed description when considered in connection with the figures, in which:

FIG. 4A illustrates a password data structure, in accordance with embodiments of the present disclosure.

FIG. 4B illustrates a hash value data structure, in accordance with embodiments of the present disclosure.

DETAILED DESCRIPTION

Figure 1:
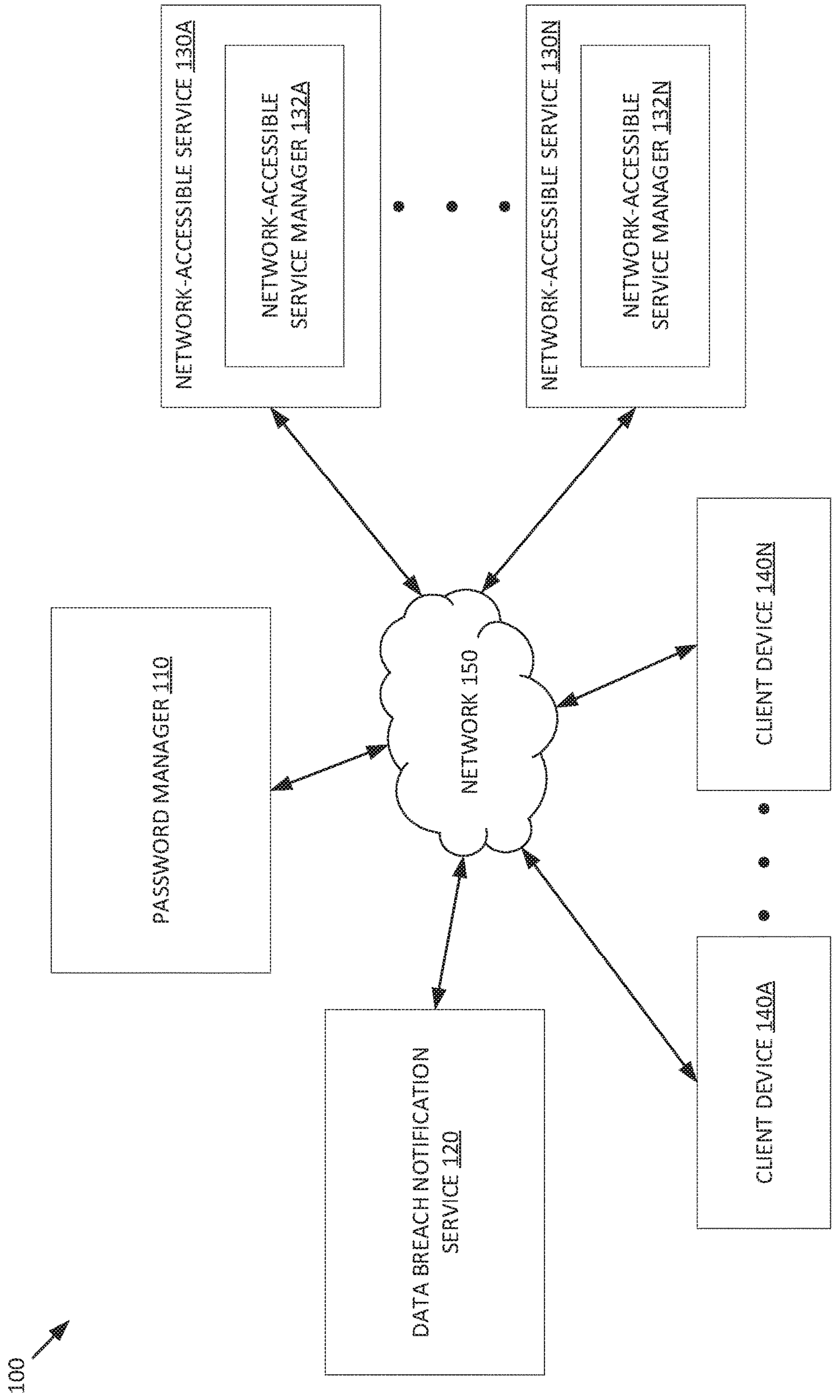
FIG. 1 illustrates a high-level component diagram of an example architecture, in accordance with one or more aspects of the present disclosure.

Described herein are methods and systems for maintaining passwords for user accounts registered with a network-accessible service. A network-accessible service can provide various features and functionality to users having accounts registered with the network-accessible service. For example, the network-accessible service can be an electronic mail (e-mail) service that enables users to transmit messages to other users. In another example, a network-accessible service can be a cloud hosting service that provides users (e.g., other network-accessible services) with access to computing resources and cloud-hosting features and functionalities. In order to access the features and functionalities provided by a network-accessible service, a user can register an account with the service. In the example of an e-mail service, a user can receive messages from and transmit messages to other users of the e-mail service via an e-mail account that is specifically registered to the user. The account registered with the network-accessible service can store or otherwise maintain data that is sensitive to a user of the account.

One way that a network-accessible service can protect a registered account from unauthorized third-party access is through the use of a password. When registering the account with the network-accessible service, the user can supply a unique password to be used to access the account. The network-accessible service can require a party (i.e., a user or another entity) attempting to access the account to supply the unique password before the party is authorized to access to the network-accessible service via the registered account. In some instances, an administrator or manager of the network-accessible service can impose password strength conditions that a user must satisfy in order to register the account with the network-accessible service. For example, a user provided password may have to satisfy a character length condition (e.g., a password needs to be longer than 12 characters), an entropy condition (e.g., a password cannot repeat the same characters twice in a row), a character value condition (e.g., a password must consist of an upper-case letter, a lower-case letter, a number, and a symbol), and so forth. A user can register accounts with multiple different network-accessible services each imposing different password strength conditions.

In some instances, a data breach event can expose data associated with user accounts of a particular network-accessible service to unauthorized third parties. A data breach event refers to an incident that exposes confidential or protected information. For example, a list of passwords and users names registered with a network-accessible service can be leaked to a malicious third party. In another example, a malicious third party can access data associated with user accounts without using a password to access the accounts. In some instances, a manager or an administrator of the network-accessible service may not be aware of the data breach event, or the extent of the data breach event, for a significant period of time after the event. After the manager or administrator of the network-accessible service becomes aware of the occurrence and/or the extent of the data breach event, users having registered accounts with the network-accessible service may not be immediately notified of the breach and even when users are notified of the breach, users may not immediately update their passwords to protect data associated with the account registered with the network-accessible service. Further, a user may re-use the same password for multiple network-accessible services in order to conveniently maintain the password user for each account registered with each service. If the password for a user account registered with a particular network-accessible service is accessible by unauthorized third parties as a result of the data breach event, other accounts registered by the user with other network-accessible services can also be at risk of access by unauthorized third parties.

Implementations of this disclosure address the above-mentioned and other deficiencies by providing a password manager for maintaining passwords of user accounts registered with various network-accessible services. In some embodiments, a client device can transmit a request to create an account with a particular network-accessible service. In response to the request, a network-accessible service manager transmits a message to the password manager with a request to create a unique password for the account. The password manager generates a unique password and a cryptographic salt value for the account and calculates a hash value of the password using the cryptographic salt value. The password manager transmits the hash value and the cryptographic salt value to the network-accessible service manager, which associates the received hash value and salt value with the registered user account.

In some embodiments, the client device can transmit a request to the password manager to access the network-accessible service. In response to authenticating that the client device is associated with the account, the password manager can identify an identifier and a password for the account from a password data structure. The password manager can transmit a request to the network-accessible service manager to authorize access by the client device to the network-accessible service. The request can include the identifier and the password for the account. The network-accessible service calculates a hash value of the provided password using the cryptographic salt value associated with the account and determine whether the hash value of the provided password corresponds to the hash value previously received from the password manager. In response to determining the hash value of the provided password corresponds to the hash value previously received from the password manager, the network-accessible service can authorize access by the client device to the service via the account.

In other or similar embodiments, the password manager encrypts the password and transmits the encrypted password to the client device that transmitted the request to register the account with the network-accessible service. To access the network-accessible service via the registered account, the client device can provide the password to the network-accessible service. The network-accessible service manager can calculate a hash value for the received password and compare the hash value to a hash value previously received from the password manager, in accordance with previously described embodiments. In response to determining the hash value of the provided password corresponds to the hash value received from the password manager, the network-accessible service can authorize access by the client device to the service via the account.

In some embodiments, the password manager can detect that an initial password for the account is to be updated. For example, the password manager can determine, based on a notification received from a data breach watchdog service, that data associated with one or more accounts registered with a particular network-accessible service has been implicated in a data breach event (e.g., has been accessed by a malicious third party). In response to determining data associated with a particular account has been compromised, the password manager can generate an updated password for the user account and a new cryptographic salt value and can calculate a hash value for the updated password using the new cryptographic salt value. The password manager transmits the hash value and the new salt value to the network-accessible service manager, which associates the received hash value and new salt value with the account. The password manager can encrypt the new password and transmit the encrypted password to the client device associated with the account, as previously described. The client device can access the network-accessible service via the registered account by using the new password received from the password manager. The network-accessible service manager calculates a hash value for the password received from the client device using the new cryptographic salt value and compares the calculated hash value to the hash value received from the password manager. In response to determining the hash value for the provided password matches the hash value received from the password manager, the network-accessible service can authorize the client device to access the network-accessible service via the account Accordingly, aspects of the present disclosure dramatically improve security of a network-accessible service by enabling a password manager to generate strong, unique passwords for accounts registered with the network-accessible service. The password manager can generate strong, unique passwords that satisfy each password strength condition imposed by a network-accessible service administrator or manager. The password manager can further detect data breach events associated with the network-accessible service and automatically generate updated passwords for each account implicated in the data breach event as soon as the data breach event is detected. As a result, an amount of time that data associated with an account or a client device associated with the account is exposed to malicious third parties is significantly reduced, as each account can be immediately protected with an updated password. Further, instead of providing the network-accessible service manager with the password for a particular user account, the password manager provides a hash value of a password for a particular account and a cryptographic salt value used to generate the hash value. As a result, the network-accessible service does not have access to the password used to secure the registered account and is therefore less likely to be a target of a data breach event by a malicious third party.

FIG. 1 illustrates a high-level component diagram of an example system architecture 100, in accordance with one or more aspects of the present disclosure. System architecture 100 can include a password manager 110, a data breach notification service 120, one or more network-accessible services 130A-N, and one or more client devices 140A-N, each of which are communicably connected over a network 150. The network 150 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Each of password manager 110, data breach notification service 120, and network-accessible service 130 can operate via a server. A server can include one or more processing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to implement secure communication, in accordance with the present disclosure. Each server can include hardware components, such as a physical central processing unit (CPU). One or more processor devices can be and/or include a micro-processor, digital signal processor (DSP), or other processing components. Each CPU can process various received data and can carry out the code or instructions or one or more computer programs, for example, to provide input/output operations specified by the instructions.

Each server can further include memory. Memory can include volatile memory devices (e.g., random access memory (RAM)), non-volatile memory devices (e.g., flash memory), storage devices (e.g., a magnetic hard disk, a Universal Serial Bus (USB) solid state drive, a Redundant Array of Independent Disks (RAID) system, a network attached storage (NAS) array, etc.), and/or other types of memory devices. It should be noted that even though each server can include a single CPU, this is merely illustrative, and that in some other examples, each server can include a two or more CPUs. Similarly, in some other examples, each server can include two or more memory components, rather than a single memory component.

Each client device 140A-N can include a computing device such as a personal computer (PC), a laptop, a mobile phone, a smart phone, a table computer, a netbook computer, a network-connected television, etc. In some implementations, client devices 140A-N can also be referred to as a "client computing device" or a "user device." In some embodiments, a client device 140A-N can provide a user with access to an account registered with a network-accessible service 130A-N. A user can refer to a human user of a network-accessible service 130. For example, network-accessible service 130A can be an e-mail service. Client device 140A can provide a user with access to an e-mail account registered with network-accessible service 130A and engage with one or more features of the network-accessible service 130A (e.g., generate an e-mail message, receive an e-mail message from another user of the e-mail service, transmit an e-mail message to another user of the e-mail service, etc.). Additionally or alternatively, a user can refer to a non-human user of a network-accessible service 130. For example, network-accessible service 130B can be a web-based service that provides application programming interfaces (APIs). The user of network-accessible service 130B can be another network-accessible service (e.g., network-accessible service 130C). Although embodiments of the current description may refer to a user account for a network-accessible service accessible by a human, it should be noted that a user account can also refer to a network-accessible service that is accessible by a non-human (e.g., a service account).

Each network-accessible service 130A-N can include a network-accessible service manager 132A-N, respectively. A network-accessible service manager 132 can be configured to handle requests from client devices 140A-N to access features and functionalities of a network-accessible service 130A-N via a registered account. For example, network-accessible service manager 132A can determine whether a client device 140A requesting access to an account registered with network-accessible service 130A is authorized to access the network-accessible service 130A via the account. In some embodiments, to determine whether the client device is authorized to access the network-accessible service 130A via the account, network-accessible service manager 132A can request that the client device 140A provide a password (e.g., a unique string of characters) associated with the account. Network-accessible service manager 132A can compare the password provided by the client device 140A to a stored password associated with the user account and, in response to determining the provided password corresponds to the stored password, network-accessible service manager 132A can authorize access by the requesting client device 140A to the network-accessible service 130A via the account. Further details regarding the authentication of a password by network-accessible service manager 132 are provided herein.

Password manager 110 can manage passwords for one or more accounts registered with various network-accessible services 130. For example, client device 140A can transmit a request to network-accessible service manager 132A to register an account with network-accessible service 132A. In response to receiving the request, network-accessible service manager 132A can transmit a request to password manager 110 to generate a password for the account. Password manager 110 can generate a unique password for the account and store the generated password in an entry of a data structure associated with the account. Password manager 110 can also generate a cryptographic salt value (referred to herein as a salt value) and store the generated salt value in the data structure entry. A cryptographic salt value refers to a fixed-length value that is added to the input of a hash function to create a unique hash value for each input to the hash function. Password manager 110 can calculate a hash value for the generated password generated using the generated salt value and transmit the calculated hash value and the salt value to network-accessible service manager 132A. Password manager 110 can also encrypt the generated password and transmit the encrypted password to client device 140A. In response to receiving the encrypted password, client device 140A can store the encrypted password in memory for the client device 140A. Additionally or alternatively, the client device 140A can decrypt the password and store the decrypted password in memory.

Network-accessible service manager 132A can store the received hash value of the account password and the salt value at an entry of a hash value data structure associated with the registered account. Network-accessible service manager 132A can receive a request to access network-accessible service 130A via the account from a client device 140A. The request can include a password. Network-accessible service manager 132A can identify, from the hash value data structure, an entry for the account and determine a salt value associated with the account. Network-accessible service manager 132A can generate a hash value for the received password using the determined salt value and can compare the generated hash value to the hash value included in the identified data structure entry. In response to determining the generated hash value corresponds to (i.e., matches) the identified, network-accessible service manager 132A can authorize access by client device 140A to network-accessible service 130A via the account. In response to determining the generated hash value does not correspond to the identified hash value of the data structure entry, network-accessible service manager 132A can deny access by the client device 140A to network-accessible service 130A. In some embodiments, network-accessible service manager 132A can also transmit a notification to password manager 110 indicating client device 140A unsuccessfully attempted to access the user account.

As described above, password manager 110 can generate a unique password for an account upon registration of the account with the network-accessible service 130. Password manager 110 can also generate an updated password for the account in response to determining the network-accessible service 130 has been implicated in a data breach event. For example, password manager 110 can determine that a password for one or more accounts registered with a particular network-accessible service 130 has been accessed by a malicious third party (e.g., the network-accessible service 130A has been hacked). In some embodiments, password manager 110 can determine that data associated with a particular account has been implicated during the data breach event (e.g., has been accessed by an unauthorized entity) based on a message received from a data breach notification service 120. Data breach notification service 120 can be configured to monitor and track data breach events associated with network-accessible services 130A-N. As illustrated, password manager 110 and data breach watchdog 120 can be different components that operate on different servers. In other or similar embodiments, password manager 110 and data breach notification service 120 can be the same component. In such embodiments, password manager 110 and data breach notification service 120 can operate on different servers or on the same server.

In response to determining a particular network-accessible service 130 has been breached, password manager 110 can identify (e.g., using the password data structure) each account registered with the particular network-accessible service 130 and generate an updated password for each account. Password manager 110 can also generate a new salt value for each updated password and store the updated password and the updated salt value in a corresponding entry for each user account in the password data structure. For each generated password, password manager 110 can calculate a hash value using a corresponding new salt value and transmit the calculated hash value to network-accessible service manager 132 of the particular network-accessible service 130, in accordance with previously described embodiments. Password manager 110 can also encrypt each updated password and transmit the encrypted password to a client device 140 associated with a corresponding account, in accordance with previously described embodiments.

Figure 2:
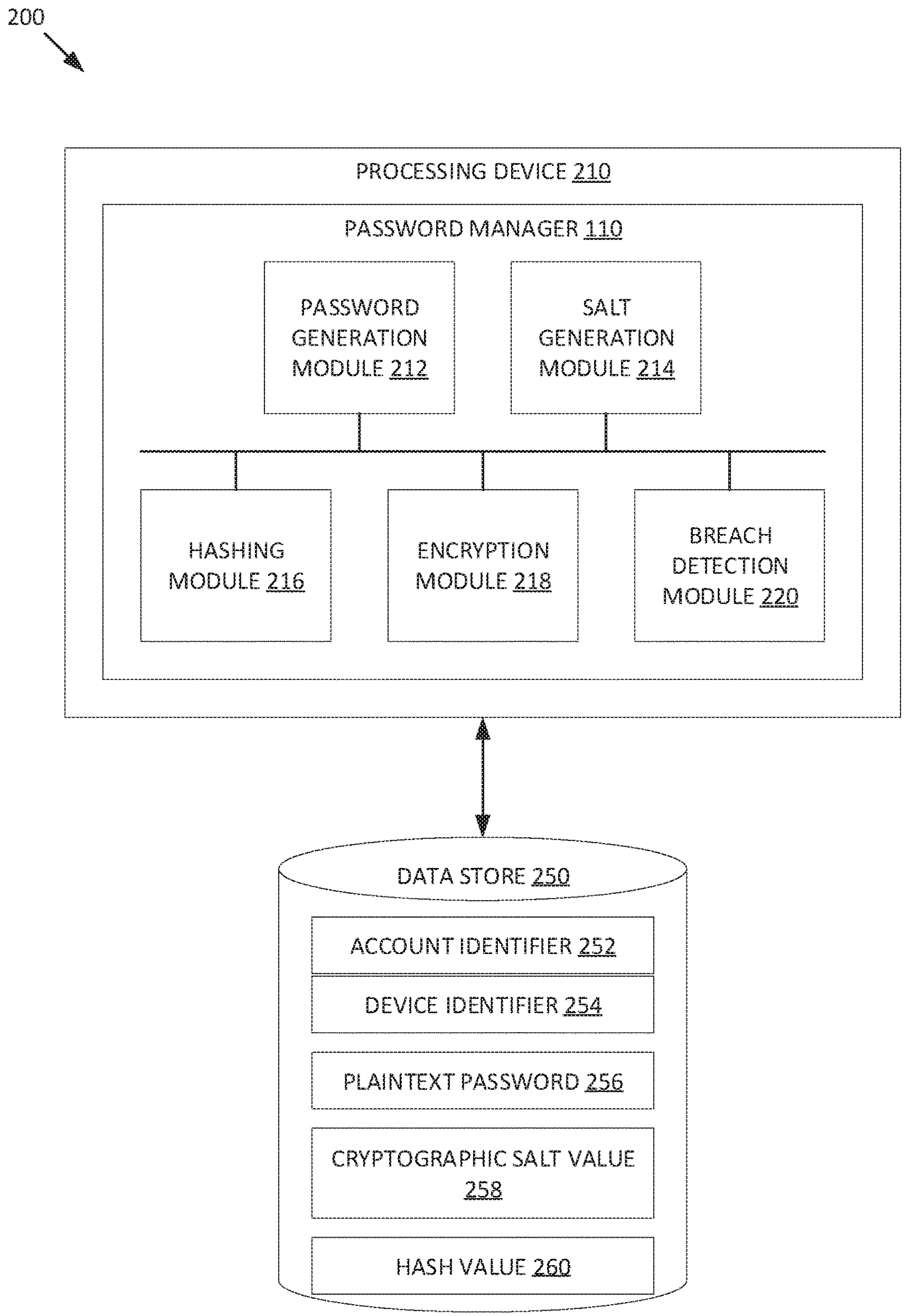
FIG. 2 depicts a block diagram illustrating an example of a processing device executing a password manager, in accordance with embodiments of the present disclosure.

FIG. 2 depicts a block diagram illustrating an example 200 of a processing device 210 executing a password manager 110, in accordance with embodiments of the present disclosure. In some embodiments, the processing device 210 can be part of a server, described with respect to FIG. 1. Processing device 210 can be coupled to memory that includes data store 250. As illustrated, password manager 110 can include a password generation module 212, a salt generation module 214, a hashing module 216, an encryption module 218, and a breach detection module 220. In some embodiments, data store 250 can store an identifier 252 for an account registered to a network-accessible service, an identifier 254 for a client device associated with the account, a plaintext password 256 for the account, an cryptographic salt value 258, and a hash value 258 for the plaintext password 256. In some embodiments, identifier 252, identifier 254, password 256, salt value 258 and/or hash value 258 can be stored in a password data structure, such as data structure 410 of FIG. 4A. Each entry of data structure 410 can correspond to a particular account registered with a network-accessible service 130. In some embodiments, each entry can include a network-accessible service identifier field 412, an account identifier field 414, a client device identifier field 416, a current password field 418, a current salt value field 420, a prior password field 422, and a prior salt value field 424. Further details regarding data structure 410 are provided herein.

Password generation module 212 can generate a password for an account registered with a network-accessible service, such as network-accessible service 130. As described previously, in response to receiving a request to register an account with a network-accessible service 130, a network-accessible service manager 132 for the network-accessible service 132 can transmit a request to password manager 110 to generate a password for the account. In some embodiments, the request can include an identifier 252 for the account and/or an identifier 254 for the client device that requested to register the account. Password manager 110 can store identifier 252 and/or identifier 254 at data store 250. In some embodiments, password manager 110 can generate an entry in data structure 410 that is associated with the account. Password manager 110 can add an identifier for the network-accessible service to the network-accessible service identifier field 412, and store the identifier 252 and/or identifier 254 in the account identifier field 414 and/or the client device identifier field, respectively.

In some embodiments, password manager 110 can receive a request from a client device to generate a password for an account registered with network-accessible service 130. In such embodiments, the request received from the client device can include an identifier 254 of the client device. Password manager 110 can receive an identifier 252 of the registered account from the client device or from the network-accessible service manager 132 for the network-accessible service. Password manager 110 can store the received identifiers 252 and/or 254 at data store 250, in accordance with previously described embodiments.

In response to receiving identifiers 252 and/or 254 (from client device 140 or network-accessible service manager 132), password generation module 212 can generate a password 256 for the registered account. In some embodiments, password generation module 212 can generate a password 256 that satisfies one or more strength conditions. A strength condition can include a password length condition, an entropy condition, a character value condition, and so forth. In some embodiments, the one or more strength conditions can be set by an administrator of the network-accessible service 130. For example, the network-accessible service 130 can be provided by a business enterprise. An administrator of the business enterprise can set particular strength conditions for passwords of each account registered with the network-accessible service 130. In other or similar embodiments, the one or more strength conditions can be determined based on commonly accepted standards associated with the network-accessible service. For example, the network-accessible service 130 can be an electronic banking service. A third party entity can recommend particular password strength conditions for accounts registered with all remote electronic banking services, including network-accessible service 130. In some embodiments, password manager 110 can receive a set of password strength conditions with the request to generate a password for an account registered with network-accessible service 130. In other or similar embodiments, password manager 110 can store a set of password strength conditions at data store 250 (not shown) and reference the set of password strength conditions in response to receiving a request to generate a password for an account.

In response to generating a password for an account, password generation module 212 can store the generated password 256 at data store 250. In some embodiments, password generation module 212 can store the generated password 256 in the entry of data structure 410 associated with the user account. For example, password generation module 212 can store the generated password 256 in the current password field 418 of the entry of data structure 410 associated with account A.

Salt generation module 214 of password manager 110 can generate a cryptographic salt value for the account registered with network-accessible service 130. As described previously, a salt value refers fixed-length value that is added to the input of a hash function to create a unique hash value for each input to the hash function. Salt generation module 214 can generate a salt value 258 for the registered account and store the salt value 258 at data store 250. In some embodiments, salt generation module 214 can store the generated salt value 258 in the entry of data structure 410 associated with the user account. For example, salt generation module 214 can store the generated salt value in the current salt field 420 of the entry of data structure 410 associated with account A.

Hashing module 216 can calculate a hash value of password 256 using salt value 258. In some embodiments, hashing module 216 can provide password 256 and salt value 258 as input values to a hashing function and receive, as an output, a hash value of the password 256. In other or similar embodiments, hashing module 216 can generate a hashing value based on password 256 and salt value 258 and provide the generated hashing value as input to the hashing function. For example, password 256 can be "password" and salt value 258 can be "123." Hashing module 216 can generate the hashing value by appending salt value 258 to a beginning (e.g., "123password") or an end of password 256 ("password123") prior to providing the hashing value as input to the hashing function. In another example, hashing module 216 can generate the hashing value by randomly injecting salt value 258 into password 256 (e.g., "pas123sword," "p123assword," "passwor123d"). In some embodiments, hashing module 216 can store the generated hash value 260 at data store 250. In other or similar embodiments, hashing module 216 can store the hashing value at data store 250 and determine hash value 260 based on the stored hashing value. In other or similar embodiments, hashing module 216 can determine hash value 260 based on the stored password 256 and the stored salt value 258, in accordance with previously described embodiments.

In response to hashing module 216 calculating hash value 260, password manager 110 can transmit hash value 260 and salt value 258 to network-accessible service manager 132. Hashing module 216 can transmit hash value 260 and salt value 258 to network-accessible service manager 132 in the same message or in separate messages. In some embodiments, hashing module 216 can also transmit a signature associated with password manager 110 to network-accessible service manager 132. The signature can be a string of characters that is unique to password manager 110 and can be used by network-accessible service manager 132 to verify an identity of password manager 110 in response to receiving hash value 260 and salt value 258. In other or similar embodiments, password manager 110 can transmit a secret value with at least one of the hash value 260 and the salt value 258. The secret value can be a value that is known only to password manager 110 and network-accessible service manager 132. Network-accessible service manager 132 can use the secret value to verify the identity of password manager 110.

In some embodiments, the client device can transmit a request to password manager 110 to access network-accessible service 130 via the account. Password manager 110 can authenticate that the client device is associated with the account. For example, password manager 110 can transmit a request to the client device for an additional password associated with an additional account for the client device registered with the password manager service. Password manager 110 can authenticate the client device is associated with the account in response to authenticating the additional password provided by the client device. In response to authenticating that the client device is associated with the account, password manager 110 can identify an identifier and a password for the account from password data structure 410. Password manager 110 can transmit a request to network-accessible service manager 132 to authorize access by the client device to the network-accessible service 130. The request can include the identifier 256 and the password 256 for the account. The network-accessible service manager 132 calculates a hash value of the provided password using the cryptographic salt value associated with the account and determine whether the hash value of the provided password corresponds to the hash value previously received from password manager 110. In response to determining the hash value of the provided password corresponds to the hash value previously received from the password manager 110, the network-accessible service manager 132 can authorize access by the client device to the service via the account.

In other or similar embodiments, password manager 110 can transmit password 256 to the client device that requested to register the account with network-accessible service 130. In some embodiments, password manager 110 can determine an address associated with the client device based on device identifier 254. For example, device identifier 254 can include an internet protocol (IP) address associated with the client device requesting to register the account with network-accessible service 130. Encryption module 218 can encrypt password 256 prior to transmitting password 256 to the client device. For example, encryption module 218 can encrypt password 256 using a public-private encryption scheme. Encryption module 218 can request a public encryption key from the client device and encrypt password 256 using the received public encryption key. In response to encrypting password 256, encryption module 218 can transmit the encrypted password 256 to the client device associated with device identifier 254.

In some embodiments, password manager 110 can determine that an updated password is to be generated for the account registered with network-accessible service 130. Password manager 110 can determine the updated password is to be generated for the account in response to detecting that a triggering condition associated with the account is satisfied. In some embodiments, password manager 10 can detect the triggering condition associated with the account is satisfied in response to receiving a notification that data associated with one or more accounts registered with a particular network-accessible service 130 has been accessed by an unauthorized party (e.g., a malicious party). Data associated with accounts registered with the network-accessible service can be accessed by an unauthorized party in response to a data breach event. Breach detection module 220 can detect when a data breach event has occurred with respect to a particular network-accessible service 130 and generate updated passwords for accounts registered with the network-accessible service 130. For example, breach detection module 220 can receive a notification from a data breach watchdog, such as data breach notification service 120 described with respect to FIG. 1. The notification can indicate that a data breach event has occurred with respect to a particular network-accessible service 130. In some embodiments, the notification can indicate that data associated each account registered with the network-accessible service 130 has been implicated in the data breach event. In other or similar embodiments, the notification can indicate that particular accounts registered with the network-accessible service 130 have been implicated in the data breach event. An account can be implicated in a data breach event if data associated with accessing the account, such as a password, is released to unauthorized parties. In other or similar embodiments, an account can be implicated in a data breach event if data has not been released to unauthorized parties, but unauthorized parties are otherwise able to access data associated with an account. For example, an account can be implicated in a data breach event if an unauthorized party is able to access the account without providing the password for the account.

In some embodiments, breach detection module 220 can identify one or more accounts registered with a network-accessible service 130 that have been implicated in a data breach event. For example, breach detection module 220 can identify, via data structure 410, one or more accounts having identifiers 252 that correspond to accounts included in the notification received from data breach notification service 120. In other or similar embodiments, breach detection module 220 can identify each account registered with the network-accessible service 130, regardless of whether each account has been specifically implicated in the data breach event. In response to identifying the one or more accounts, password generation module 212 can generate an updated password for each identified account and store each updated password at data store 250.

In some embodiments, password manager 110 can store an initial password for a particular account with the generated updated or new password at data structure 250. For example, password manager 110 can copy an initial password (e.g., a password created for the account when the account was registered with the network-accessible service 130) from the current password field 418 of an entry of data structure 410 to the prior password field 422. Password manager 110 can then remove or erase the initial password from the current password field 418 and write the new or updated password to the current password field 418.

Salt generation module 214 can generate a new salt value 258 for the updated password 256, in accordance with previously described embodiments. Password manager 110 can store the generated salt value 258 with an initial salt value 258 for the particular account. For example, password manager 110 can copy an initial salt value (e.g., a salt value created for the account when the account was registered with the network-accessible service 130) from the current salt value field 420 of the entry of data structure 410 to the prior salt value field 424. Password manger 110 can then remove or erase the initial salt value from the current salt value field 420 and write the new or updated salt value 258 to the current salt value field 420.

In response to the updated password and new salt value being stored at data store 250, hashing module 216 can generate a hash value for the updated password using the new salt value, in accordance with previously described embodiments. Hashing module 216 can store the hash value at data store 250 or store a hashing value provided to the hash function at data store 250, as previously described. In response to generating the hash value for the updated password, password manager can transmit the hash value and the new salt value to the network-accessible service manager 132 for the breached network-accessible service 130, in accordance with previously described embodiments. In some embodiments, password manager 110 can also transmit a signature associated with password manager 110 with the hash value and/or the salt value. Encryption module 218 can encrypt the new or updated password and transmit the encrypted password to a client device associated with the registered user account, as previously described.

In some embodiments, in response to transmitting the hash value for the updated password and the new salt value, password manager 110 can receive, from network-accessible service manager 132, a request for a hash value of a prior password associated with the account. In some embodiments, password manager 110 can identify a prior password and a prior salt value from the prior password field 422 and prior salt value field 424, respectively, from an entry of data structure 410 associated with the account. In other or similar embodiments, password manager 110 can identify a hashing value (i.e., generated based on the prior password and prior salt value) that was previously used to generate the hash value of the prior password from the entry of data structure 410. Hashing module 216 can generate the hash value of the prior password using the prior password and prior salt value, or the prior hashing value, in accordance with previously described embodiments. In other or similar embodiments, password manager 110 can retrieve a hash value for the prior password from the data store 250. Password manager 110 can transmit the hash value for the prior password to network-accessible service manager 132, in response to the request.

As described above, password manager 110 can generate an updated password and a new salt value for an account registered with a network-accessible service 130 in response to detecting a data breach event with respect to the network-accessible service 130. In some embodiments, password manager 110 can generate the new or updated password and salt value without detecting a data breach event. For example, a client device accessing an account registered with a network-accessible service 130 can transmit a request to the network-accessible service 130 to update the password for the account. Network-accessible service manager 132 can transmit a request to password manger 110 to generate a new or updated password in response to receiving the request from the client device. In another example, an administrator of the network-accessible service 130 can set a password renewal condition for each account registered with the network-accessible service 130. The password renewal condition can cause password manager 110 to generate an updated password for each account registered with the network-accessible service 130 at particular time intervals (e.g., every month, every six months, every year, etc.). At each time interval, password manager 110 can receive a request from network-accessible service manager 132 to generate an updated or new password for each account registered with network-accessible service 130 and password manager 110 can generate the new or updated password in response to the received request. In some embodiments, password manager 110 does not receive a request from network-accessible service manager 132 at each time interval and instead automatically generates an updated password for each account registered with the network-accessible service 130 at each time interval.

Figure 3:
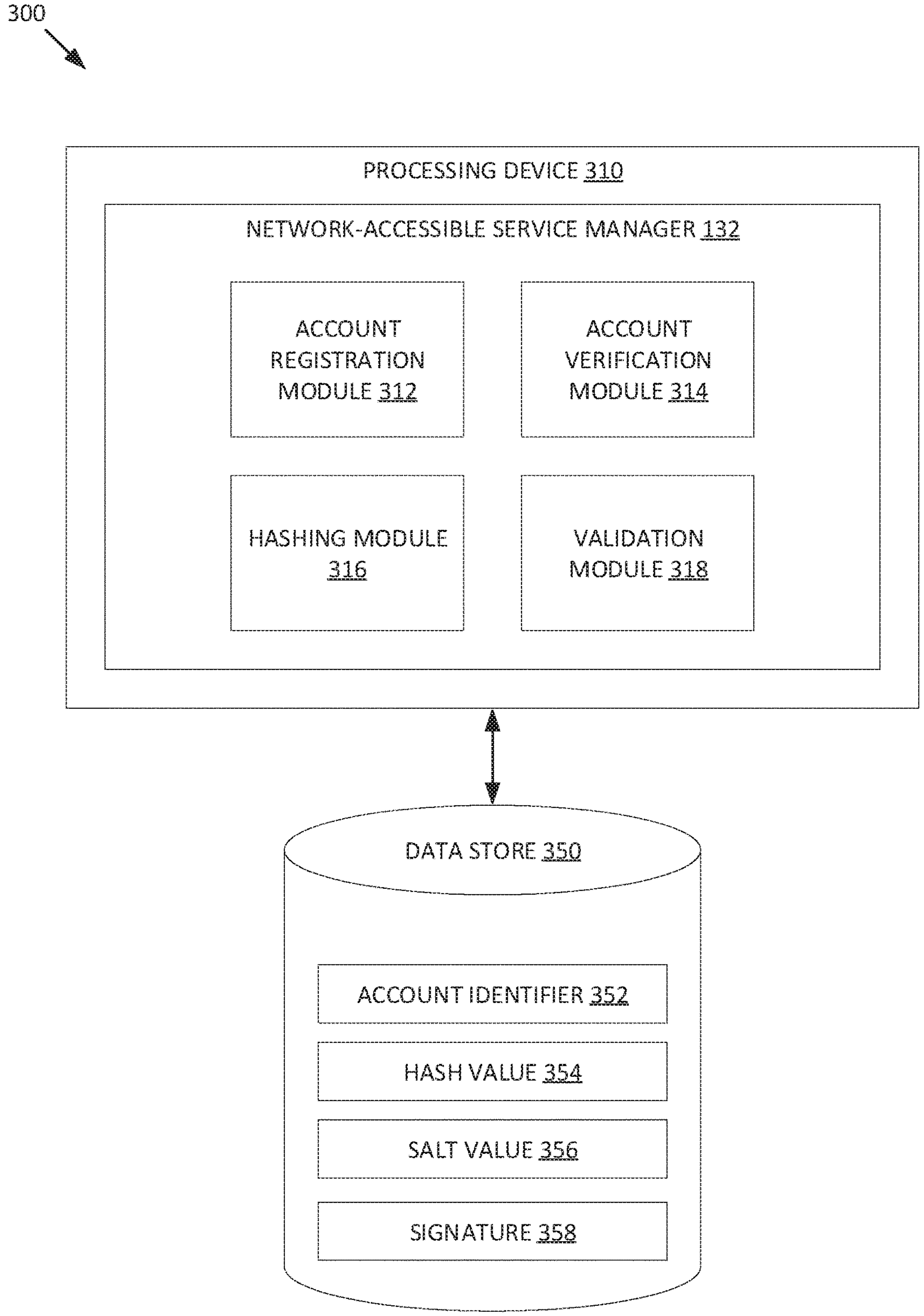
FIG. 3 illustrates a block diagram illustrating an example of a processing device executing a network-accessible service manager, in accordance with embodiments of the present disclosure.

FIG. 3 depicts a block diagram illustrating an example 300 of a processing device 310 executing a network-accessible service manager 132, in accordance with embodiments of the present disclosure. In some embodiments, the processing device 310 can be part of a server, described with respect to FIG. 1. Processing device 310 can be coupled to memory that includes data store 350. As illustrated, network-accessible service manager 132 can include an account creation module 312, an account verification module 314, a hashing module 316, and a validation module 318. Data store 350 can store an identifier 352 for an account registered to network-accessible service 130, a hash value 354 for a password associated with the account, and a cryptographic salt value associated with the account. In some embodiments, identifier 352, hash value 354, and salt value 356 can be stored in a hash value data structure, such as data structure 450 of FIG. 4B. Each entry of data structure 450 can correspond to a particular account registered with the network-accessible service 130. In some embodiments, each entry can include an account identifier field 452, a current hash value field 454, a current salt value field 456, a prior hash value field 458, and a prior salt value field 460. Further details regarding data structure 450 are provided herein.

Account registration module 312 can register an account with network-accessible service 130 in response to receiving a request from a client device. In some embodiments, the request from the client device can include information associated with the client device and/or a user of the client device. For example, the request can include a network address (e.g., an IP address) associated with the client device. In another example, the request can include identifying information associated with a user of the client device, such as a username. In some embodiments, account registration module 312 can generate account identifier 352 based on the additional information received in the request. For example, account identifier 352 can correspond to a username provided in the request. In other or similar embodiments, account identifier 352 is not generated based on information included in the request. For example, account registration module 312 can generate account identifier 352 using a random number generator. Account registration module 312 can store account identifier 352 at data store 350. In some embodiments, account registration module 312 can generate an entry in data structure 450 corresponding to the registered account and can store the account identifier 352 in the account in the account identifier field 452 of the generated data structure entry.

In response to generating account identifier 352, account registration module 312 can transmit a request to password manager 110 to generate a password for the account. In some embodiments, account registration module 312 can transmit account identifier 352 with the request. In other or similar embodiments, account registration module 312 can transmit additional information associated with the client device and/or the user of the client device to password manager 110. For example, account registration module 312 can transmit the network address associated with the client device to password manager 112 with the request to generate the password for the account.

Account registration module 312 can receive a hash value 354 of the password and a salt value 356 for the account, in response to transmitting the request to the password manager 110. Account registration module 312 can store the received hash value 354 and the received salt value 356 at data store 350. In some embodiments, account registration module 312 can store the received hash value 354 at the current hash value field 454 and the received salt value 356 at the current salt value field 456 of the data structure entry corresponding to the account, in accordance with previously described embodiments. In some embodiments, password manager 110 can transmit, with hash value 354 and/or salt value 356, a signature 358 associated with password manager 110. The signature 358 can be a unique identifier corresponding with password manager 110. For example, signature 358 can include a random string of characters. In response to receiving the signature 358, validation module 318 can store signature 358 at data store 350. Validation module 318 can also store with signature 358 an indication that signature 358 is associated with password manager 110.

Account verification module 314 can authorize access for a client device to network-accessible service 130. For example, network-accessible service manager 132 can receive a request from password manager 110 to authorize access by a client device to access network-accessible service 130 via an account registered with network-accessible service 130. In another example, network-accessible service manager 132 can receive the request to access the account directly from the client device. In some embodiments, the received request can include at least one of an identifier or a password for the registered account. Account verification module 314 can verify that the password provided in the received request corresponds to the password associated with the registered account based on a hash value of the provided password. Account verification module 314 can identify a salt value associated with the account stored at data store 350. In some embodiments, account verification module 314 can identify an entry in data structure 450 associated with the account and identify a current salt value from the current salt value field 456 of the identified entry.

Hashing module 316 can generate a hash value 354 for the provided password using the current salt value 356 for the account. Hashing module 316 can provide the provided password and the current salt value 356 as input values to a hashing function and receive, as an output, the hash value 354 for the provided password. In some embodiments, the hashing function used by hashing module 316 corresponds to the hashing function used by hashing module 216 of password manager 110. Account verification module 314 can compare the hash value received as an output of the hash function with the hash value 354 associated with the account (e.g., stored in the current hash value field 456 of the entry for the account). In response to determining the calculated hash value corresponds with (i.e., matches) hash value 354, account verification module 314 can authorize access for the client device to the network-accessible service 130 via the account. In response to determining the calculated hash value does not correspond with hash value 354, account verification module 314 can deny access for the client device to the network-accessible service 130. In some embodiments, network-accessible service manager 132 can transmit a notification to password manager 110 indicating the client device unsuccessfully attempted to access the network-accessible service 130 via the user account.

In some embodiments, hashing module 316 can calculate a set of hash values for the password provided in the request from the client device. For example, hashing module 316 can generate a set of hashing values to be provided as input to the hash function. Each hashing value can be generated based on the provided password and the salt value. For example, the provided password can be "password1" and the salt value can be "456." Hashing module 316 can generate a hashing value by appending the salt value to the beginning of the provided password (e.g., "456password1") or to the end of the provided password (e.g., "password1456"). Hashing module 316 can also generate a hashing value by injecting the salt value into various spaces of the provided password (e.g., "p456assword1," "pa456ssword1," "pas456sword1," etc.). Hashing module 316 can generate a set of hashing values and provide each hashing value as an input to the hash function. Account verification module 314 can compare each calculated hash value for the provided password to hash value 354 to determine whether a particular hash value corresponds with hash value 354. In response to determining a calculated hash value for the provided password corresponds to hash value 354, account verification module 314 can authorize the client device to access the network-accessible service 130 via the account, in accordance with previously described embodiments.

As described previously, password manager 110 can generate an updated password for an account registered with network-accessible service 130 (e.g., in response to a data breach or data leak event, based on password renewal conditions set by an administrator of network-accessible service 130, etc.). Network-accessible service manager 132 can receive a hash value of an updated password and an updated salt value for an account registered with the network-accessible service, in response to password manager 110 generating the updated or new password for the account. Validation module 318 can validate whether the hash value of the updated password and/or the salt value is sent from password manager 110 or from a malicious party. In some embodiments, validation module 318 can receive a signature with the hash value for the updated password and/or the updated salt value. The signature can identify the party or entity that sent the hash value and/or the salt value to network-accessible service manager 132. Validation module 318 can compare the received signature with a signature 358 stored at data store 350. As described previously, signature 358 can be a unique string of characters associated with password manager 110 previously provided to network-accessible service manager 132 by password manager 110. In response to determining the received signature corresponds with signature 358, validation module 318 can determine that the hash value for the updated password and/or the updated salt value is received from password module 110 instead of a malicious party. In response to determining the received signature does not correspond with signature 358, validation module 318 can determine the received hash value and salt value are not received form password module 110. Additionally or alternatively, validation module 318 can receive a secret value known to password manager 110 and network-accessible service manager 132. Validation module 318 can authenticate the identity of password manager 110 by comparing the received secret value to a previously defined secret value associated with password manager 110, in accordance with previously described embodiments.

In some embodiments, validation module 318 can request additional information from the entity that transmitted the hash value for the updated password and/or updated salt value. For example, validation module 318 can transmit a request to the entity for a hash value of an initial or prior password associated with the registered account. In response to receiving the hash value of the initial or prior password, validation module 318 can compare the received hash value to hash value 354. In response to determining the received hash value corresponds to hash value 354, validation module 318 can determine that the entity that sent the hash value for the updated password and/or the updated salt value is password manager 110.

In response to validation module 318 determining the received hash value and/or salt value is received from password manager 110, account registration module 312 can store the received hash value and the received salt value at data store 350. For example, account registration module 312 can identify an entry of data structure 450 corresponding to the account registered with network-accessible service 130. Account registration module 312 can copy the hash value 354 from the current hash value field 454 to a prior hash value field 458 and the salt value 356 form the current salt value field 456 to the prior salt value field 460 of the identified entry. Account registration module 312 can then remove or erase hash value 354 and salt value 356 from current hash value field 454 and current salt value field 456, respectively, and write the received hash value in the current hash value field 454 and the received salt value in the current salt value field 456. Account verification module 314 can use the hash value of the updated password and the current salt value to determine whether a client device is authorized to access network-accessible service 130 via the account, in accordance with previously described embodiments.

Figure 5:
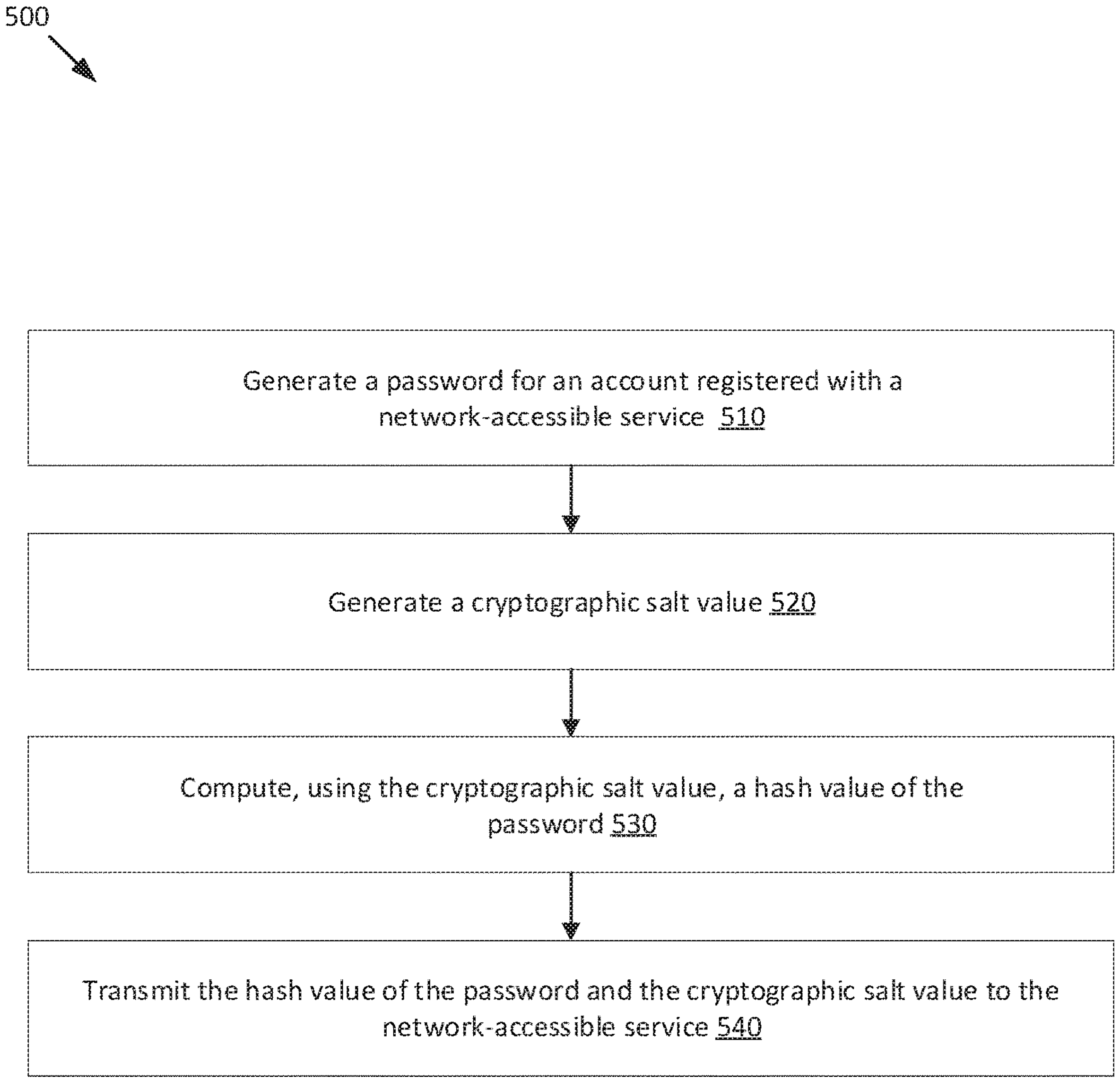
FIG. 5 is a flow diagram of a method for generating an updated password for an account registered with a network-accessible service, in accordance with embodiments of the present disclosure.
Figure 6:
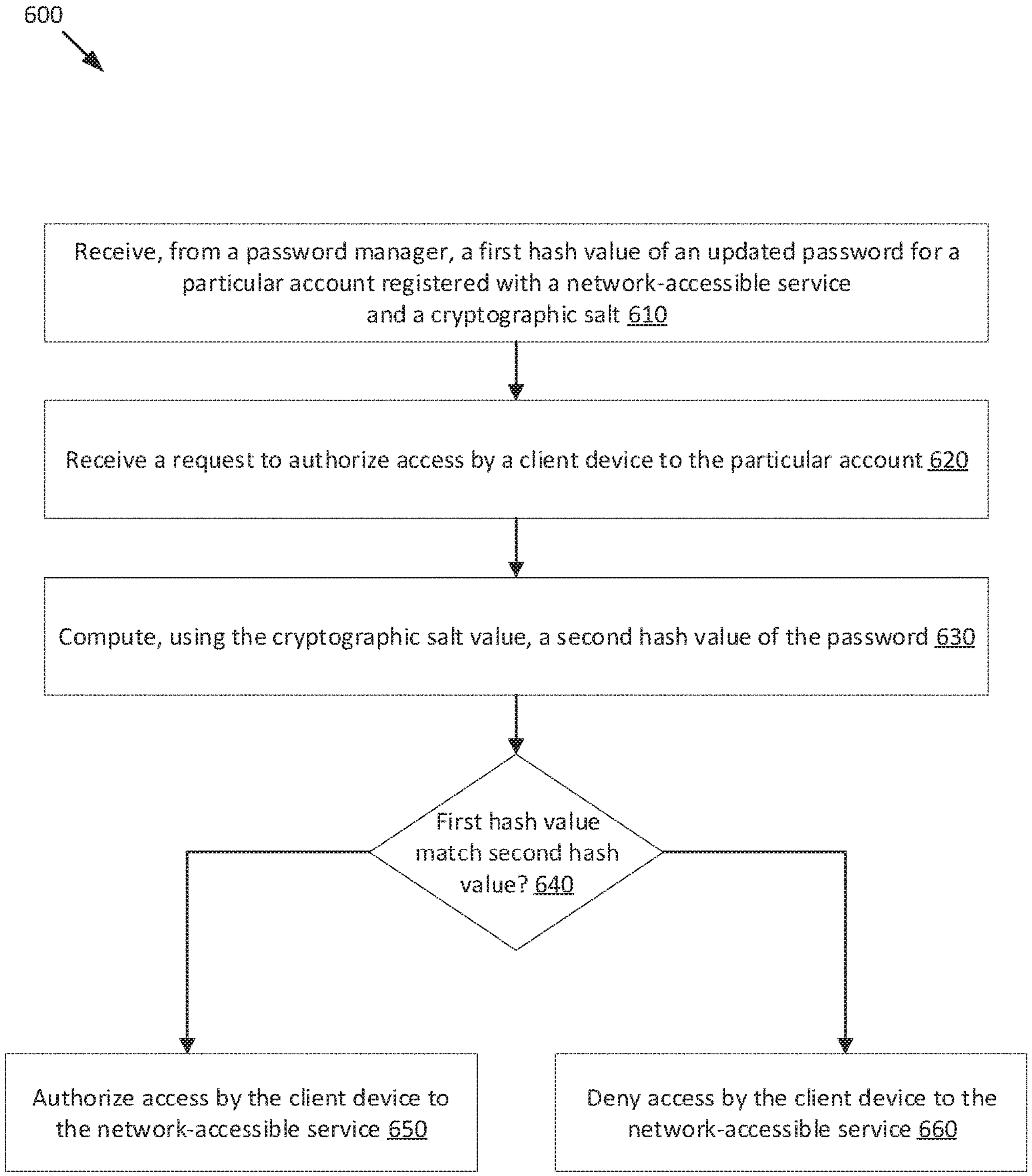
FIG. 6 is a flow diagram of another method for authorizing access of a client device to a network-accessible service, in accordance with embodiments of the present disclosure.

FIG. 5 is a flow diagram of a method 500 for generating an updated password for an account registered with a network-accessible service, in accordance with embodiments of the present disclosure. FIG. 6 is a flow diagram of a method 600 for authorizing access of a client device to a network-accessible service, in accordance with embodiments of the present disclosure. Method 500 can be performed by password manager 110 and method 600 can be performed by network-accessible service manager 132, in accordance with previously described embodiments. Methods 500 and 600 can be performed by processing logic that can comprise hardware (circuitry, dedicated logic, etc.), software (e.g., software executed by a general purpose computer system or a dedicated machine), or a combination of both. Methods 500 and 600 and each of their individual functions, routines, subroutines, or operations can be performed by one or more processors of the computer device executing the method. In certain implementations, methods 500 and 600 can each be performed by a single processing thread. Alternatively, methods 500 and 600 can be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts can be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 5, method 500 begins at block 510, where a password manager (e.g., password manager 110) generates a password for an account registered with a network-accessible service. In some embodiments, the password manager can generate the password for the registered account in response to detecting a triggering condition associated with the account is satisfied. For example, the password manager can receive a notification (e.g., from data breach watchdog 120) that data associated with a set of accounts registered with a particular network-accessible service has been accessed by an unauthorized party (e.g., a malicious party). The password manager can detect the triggering condition associated with the account is satisfied by determining the account is included in the set of accounts.

At block 520, the password manager can generate a cryptographic salt value. The cryptographic salt value can be generated using an entropy source having at least a known entropy strength. At block 530, the password manager can compute, using the cryptographic salt value, a hash value of the password. At block 540, the password manager can transmit the hash value of the password and the cryptographic salt value to the network-accessible service. In some embodiments, the password manager can further transmit a signature associated with the password manager to the network-accessible service with the updated password and/or the cryptographic salt value. In some embodiments, the password manager can also transmit the password to a client device associated with the registered user account. For example, the password manager can encrypt the updated password and transmit the encrypted password to the client device.

In other or similar embodiments, the password manger can identify (e.g., from a data structure or a database) an initial password for the account registered with the network-accessible service. The initial password can be associated with an initial cryptographic salt value. The password manager can compute a hash value of the initial password using the initial cryptographic salt value and transmit the hash value to the network-accessible service with the hash value for the updated password and/or the updated cryptographic salt value.

As described above, FIG. 6 is a flow diagram of a method 600 of authorizing access for a client device to a network-accessible service. Method 600 begins at block 610 where a network-accessible service manager (e.g., network-accessible service manager 132A-N) receives, from a password manager (e.g., password manager 112) a first hash value of an updated password for a particular account registered with a network-accessible service. The network-accessible service manager can also receive a cryptographic salt value from the password manager.

At block 620, the network-accessible service manager receives, from a client device, a request to access the particular account. The request can include a password. At block 630, the network-accessible service manager computes, using the cryptographic salt value, a second hash value of the password. In some embodiments, the network-accessible service manager can compute a set of hash values of the password. At block 640, the network-accessible service manager determines whether the first hash value matches the second hash value. In response to the network-accessible service manager determining the first hash value matches the second hash value, method 600 proceeds to block 650. In some embodiments, the network-accessible service manager compares the first hash value to each of the set of hash values calculated at block 630. Method 600 proceeds to block 650 in response to determining a hash value (i.e., the second hash value) matches the first hash value. In response to the network-accessible service manager determining the first hash value does not match the second hash value, method 600 proceeds to block 660.

At block 650, the network-accessible service manager authorizes access by the client device to the network-accessible service. In some embodiments, the network-accessible service manager can also receive a signature with the received first hash value or the received cryptographic salt value. The network-accessible service manager can compare the received signature to a pre-defined signature associated with the password manager and can authorize access by the client device to the network-accessible service in response to determining the received signature corresponds to the pre-defined signature. In other or similar embodiments, the network-accessible service manager can receive, from the password manager, a third hash value of an initial password associated with the registered account. The network-accessible service manager can identify (e.g., from an entry of a data structure corresponding to the particular account, a fourth hash value of the initial password for the particular account. The network-accessible service manager can compare the receive third hash value to the identified fourth hash value and determine whether the third hash value corresponds to (i.e., matches) the fourth hash value for the initial password. In response to determining the third hash value corresponds to the fourth hash value, the network-accessible service manager can authorize access by the client device to the network accessible service.

At block 660 the network-accessible service manager denies access by the client to the network-accessible service. In some embodiments, the network-accessible service manager can also transmit a notification to the password manager indicating that a client device has unsuccessfully access the particular account for the network-accessible service.

Figure 7:
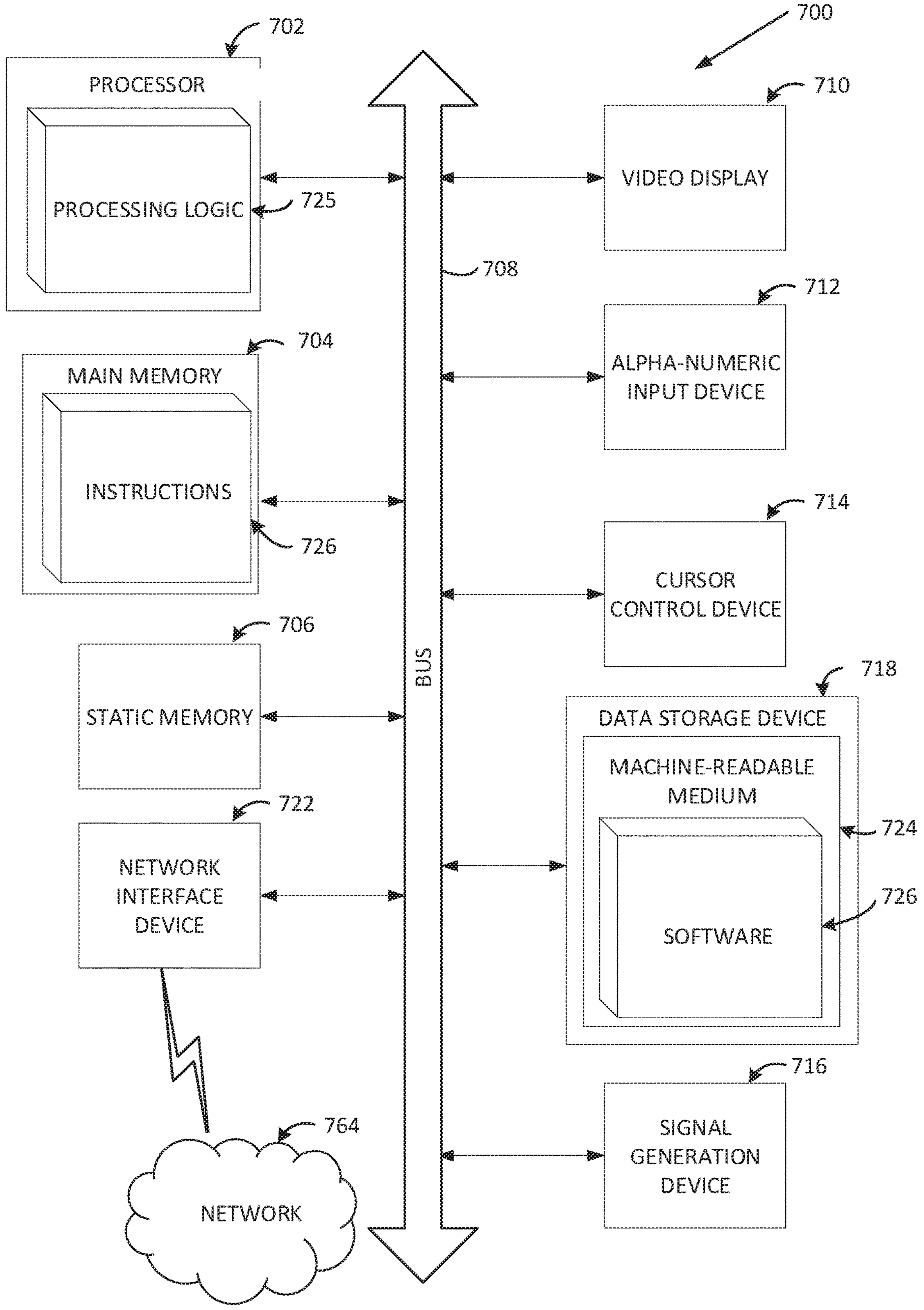
FIG. 7 is a block diagram illustrating a computing system in which implementations of the disclosure can be used.

FIG. 7 is a block diagram illustrating a computer system in which implementations of the disclosure can be used. In some implementations, the computer system 700 can support maintaining passwords for network-accessible service accounts, in accordance with previously described embodiments.

In certain implementations, computer system 700 can be connected (e.g., via a network, such as a Local Area Network (LAN), an intranet, an extranet, or the Internet) to other computer systems. Computer system 700 can operate in the capacity of a server or a client computer in a client-server environment, or as a peer computer in a peer-to-peer or distributed network environment. Computer system 700 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 716, which communicate with each other via a bus 708.

Processing device 702 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is to execute the instructions 726 for performing the operations and steps discussed herein.

The computer system 700 can further include a network interface device 722 communicably coupled to a network 725. The computer system 700 also can include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

Instructions 726 can reside, completely or partially, within volatile memory 704 and/or within processing device 702 during execution thereof by computer system 700, hence, volatile memory 704 and processing device 702 can also constitute machine-readable storage medium 724. Data storage device 716 can include a computer-readable storage medium 724 (e.g., a non-transitory computer-readable storage medium) on which can store instructions 726 encoding any one or more of the methods or functions described herein, including instructions for implementing method 500 of FIG. 5 and method 600 of FIG. 6.

The non-transitory machine-readable storage medium 724 can also be used to store instructions 726 to support caching results of certain commands utilized for maintaining passwords for network-accessible service accounts described herein, and/or a software library containing methods that call the above applications. While the machine-accessible storage medium 724 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and does not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods 500 and 600 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to

What is claimed is:

1. A system comprising:

a memory; and a processing device coupled to the memory, wherein the processing device is to:

receive, from a password manager, a first hash value of a password for a particular account registered with a network-accessible service, a cryptographic salt value, and a signature;

receive a request to access the particular account registered with the network-accessible service by a client device associated with the particular account, the request comprising the password for the particular account registered with the network-accessible service;

compute, using the cryptographic salt value, a plurality of second hash values of the password based on a plurality of hashing values, wherein, to compute the plurality of second hash values of the password, the processing device is to:

for each location of a plurality of different locations within the password:

inject the cryptographic salt value into the location within the password to generate a corresponding hashing value of the plurality of hashing values, the corresponding hashing value comprising the password with the cryptographic salt value injected into the location within the password; and compute a second hash value of the plurality of second hash values of the password based on the corresponding hashing value; and responsive to determining that the first hash value of the password matches a second hash value of the plurality of second hash values of the password, and the signature corresponds to a pre-defined signature that identifies the password manager, authorize access by the client device to the network-accessible service, wherein the pre-defined signature is obtained prior to receiving the signature.

2. The system of claim 1, wherein the processing device is further to:

receive, from the password manager, a secret value that is known to the password manager and the network-accessible service, wherein the processing device is to authorize access by the client device to the network-accessible service responsive to authenticating the secret value.

3. The system of claim 1, wherein the processing device is further to:

receive, from the password manager, a hash value of an additional password for the particular account registered with the network-accessible service, wherein the additional password is an initial password for the particular account, and wherein the processing device is to authorize access by the client device to the network-accessible service responsive to determining the hash value of the additional password satisfies a verification criterion.

4. The system of claim 1, wherein the processing device is further to:

compare the first hash value to each of the plurality of second hash values of the password.

5. A method comprising:

receiving, from a password manager, a first hash value of a password for a particular account registered with a network-accessible service, a cryptographic salt value, and a signature;

receiving a request to access the particular account registered with the network-accessible service by a client device associated with the particular account, the request comprising the password for the particular account registered with the network-accessible service;

computing, using the cryptographic salt value, a plurality of second hash values of the password based on a plurality of hashing values, wherein computing the plurality of second hash values of the password comprises:

for each location of a plurality of different locations within the password:

injecting the cryptographic salt value into the location within the password to generate a corresponding hashing value of the plurality of hashing values the corresponding hashing value comprising the password with the cryptographic salt value injected into the location within the password; and computing a second hash value of the plurality of second hash values of the password based on the corresponding hashing value; and responsive to determining that the first hash value of the password matches a second hash value of the plurality of second hash values of the password, and the signature corresponds to a pre-defined signature that identifies the password manager, authorizing access by the client device to the network-accessible service, wherein the pre-defined signature is obtained prior to receiving the signature.

6. The method of claim 5, further comprising:

receiving, from the password manager, a secret value that is known to the password manager and the network-accessible service, wherein access by the client device to the network-accessible service is authorized responsive to authenticating the secret value.

7. The method of claim 5, further comprising:

receiving, from the password manager, a hash value of an additional password for the particular account registered with the network-accessible service, wherein the additional password is an initial password for the particular account, and wherein access by the client device to the network-accessible service is authorized responsive to determining the hash value of the additional password satisfies a verification criterion.

8. The method of claim 5, further comprising:

comparing the first hash value to each of the plurality of second hash values of the password.

9. A non-transitory computer readable storage medium including instructions that, when executed by a processing device, cause the processing device to:

receive, from a password manager, a first hash value of a password for a particular account registered with a network-accessible service, a cryptographic salt value, and a signature;

receive a request to access the particular account registered with the network-accessible service by a client device associated with the particular account, the request comprising the password for the particular account registered with the network-accessible service;

compute, using the cryptographic salt value, a plurality of second hash values of the password based on a plurality of hashing values, wherein, to compute the plurality of second hash values of the password, the processing device is to:

for each location of a plurality of different locations within the password:

inject the cryptographic salt value into the location within the password to generate a corresponding hashing value of the plurality of hashing values the corresponding hashing value comprising the password with the cryptographic salt value injected into the location within the password; and compute a second hash value of the plurality of second hash values of the password based on the corresponding hashing value; and responsive to determining that the first hash value of the password matches a second hash value of the plurality of second hash values of the password, and the signature corresponds to a pre-defined signature that identifies the password manager, authorize access by the client device to the network-accessible service, wherein the pre-defined signature is obtained prior to receiving the signature.

10. The non-transitory computer readable storage medium of claim 9, wherein the processing device is further to:

receive, from the password manager, a secret value that is known to the password manager and the network-accessible service, wherein the processing device is to authorize access by the client device to the network-accessible service responsive to authenticating the secret value.

11. The non-transitory computer readable storage medium of claim 9, wherein the processing device is further to:

receive, from the password manager, a hash value of an additional password for the particular account registered with the network-accessible service, wherein the additional password is an initial password for the particular account, and wherein the processing device is to authorize access by the client device to the network-accessible service responsive to determining the hash value of the additional password satisfies a verification criterion.

* * * * *